United States Patent [19]
Nordström et al.

[11] Patent Number: 5,386,952
[45] Date of Patent: Feb. 7, 1995

[54] METHOD AND MEANS TO PREVENT CONDENSATION IN MONOCOQUE STRUCTURES

[76] Inventors: Christer Nordström, Hallingstorp, S-590 54 Sturefors; Tomas Axelsson, Snickarestigen 4, S-240 13 Genarp; Thomas White, Tryggs väg 2, S-610 55 Stigtomta, all of Sweden

[21] Appl. No.: 923,790
[22] PCT Filed: Feb. 13, 1991
[86] PCT No.: PCT/SE91/00098
  § 371 Date: Aug. 31, 1992
  § 102(e) Date: Aug. 31, 1992
[87] PCT Pub. No.: WO91/13803
  PCT Pub. Date: Sep. 19, 1991

[30] Foreign Application Priority Data
Mar. 6, 1990 [SE] Sweden .............................. 9000779

[51] Int. Cl.⁶ ............................................. B64D 13/00
[52] U.S. Cl. .................................................. 244/118.1
[58] Field of Search ............ 244/118.1, 118.5, 117 R, 244/119; 165/41; 62/239

[56] References Cited

U.S. PATENT DOCUMENTS

| 2,511,877 | 6/1950 | Protzeller | 244/118.5 |
| 4,684,081 | 8/1987 | Cronin | 244/118.5 |
| 4,742,760 | 5/1988 | Horstman et al. | 244/118.5 |
| 4,814,579 | 3/1989 | Mathis et al. | 244/118.5 |
| 5,145,124 | 9/1992 | Brunskill et al. | 244/118.5 |

FOREIGN PATENT DOCUMENTS

| 3812739 | 7/1989 | Germany | 244/118.5 |
| 2125956 | 3/1984 | United Kingdom | 244/118.5 |

*Primary Examiner*—Galen L. Barefoot
*Attorney, Agent, or Firm*—Watson, Cole, Grindle & Watson

[57] ABSTRACT

In order to prevent moisture from condensing into water in an intermediate space between an outer hermetic shell and an inner partition of an airplane, or for removing any water present in the intermediate space, dry air having a relative humidity of less than 50% is directed into the intermediate space from a dehumidifying device which accepts humid air from inside the passenger compartment.

15 Claims, 3 Drawing Sheets

METHOD AND MEANS TO PREVENT CONDENSATION IN MONOCOQUE STRUCTURES

BACKGROUND OF THE INVENTION

This invention relates to a method for preventing water vapour in humid air in an inner space of a monocoque structure which has an outer, at least an essentially hermetic structure and an inner partition which is devised to provide a space adjacent the hermetic shell, e.g., a pressure cabin of an aeroplane, from condensating into water and possibly freezing into ice on the inside of the outer hermetic shell which constitutes the monocoque structure and in the space by the shell, and for removing existing water, if any, from this space. Although primarly intended to be applicable to aeroplanes, the invention is applicable to stationary as well as transportable structures, e.g., constructions, containers and ground vehicles.

A pressure cabin of an aeroplane constitutes an essentially hermetic monocoque structure which is pressurized through a flow of heated air from the aeroplane's engine compressors and is directed into the cabin after the regulation of pressure, temperature and humidity. The engines of the aeroplane must therefore be operating, wherefore this type of pressurisation normally is done only during flight. A similar system, which is however preferably meant for being stationed on ground, is described in U.S. Pat. No. 3,623,332. Systems of this kind are intended for creating a conditioning of air which is blown into the aeroplane's pressure cabin in order to provide good comfort to the aeroplane's passengers and crew without considering the possible condensation of the water vapour which exists in the air. These systems have consequently not been utilised in order to eliminate damage to the monocoque structure of the aeroplane or to other vital parts of the aeroplane which are caused by water which condenses in the aeroplane.

Concurrently with the increasing costs of new produced aeroplanes, it has become an aim among the airlines to extend the aeroplane's life expectancy beyond the originally projected life expectancy. Components such as engines and other equipment therefore can be overhauled and exchanged continuously during the use of the aeroplane, whereas worn and damaged parts of the aeroplane body have turned out to be more difficult and time-consuming to repair and also contribute to extra weight. Damage to the aeroplane body is mostly caused by corrosion, mainly on the aeroplane's pressure cabin, which is comprised of a hermetic shell, which on the inside maintains an environment with a high humidity arising from i.a. the water each passenger emits during the stay in the aeroplane, and which on the outside is exposed to very low air temperatures. The outer shell of the pressure cabin is further complemented with a heat-insulated inner partition extended along the mentioned shell. There is no diffusion barrier preventing water vapor between the inner partition and the outer shell, wherefore the humid air in the cabin reaches the cold outer shell unimpededly, where the water in the air condensates and possibly also freezes into ice.

In a known aeroplane accident where the roof of the pressure cabin was torn off in the air, the reason for the insufficient strength was that the pressure cabin had been exposed to very severe corrosion, which had contributed to a decrease in the fatigue strength of the pressure cabin.

In addition to damage to parts of the aeroplane body itself, the condensed water also causes damage to other components and foremost to electrical apparatuses. Even mould and fungus assaults can be found in humid areas of an aeroplane. To prevent the occurrence of such damage, it has been necessary to enclose these components in water-proof covers and similar devices, which has made not only the cost of the structures higher but it has also increased the aeroplane's weight. Because of the pressure changes in the aeroplane, humid air penetrates into the components in spite of these measures and causes damage.

Experience has also shown that an aeroplane of the conventional type for 120–150 passengers contains at least 500 kg water in free form on free surfaces and in cavities and similar places, as well as absorbed in the insulation of the pressure cabin and in hygroscopic materials. Even considerably larger amounts of water can be collected in the aeroplane during flight, e.g., in the form of ice, which when melted must be drained or be removed in another way before the aeroplane can be taken into traffic again. The increase of the aeroplane's futile load in the form of condensed water, which can not be removed during the ground stops, is therefore a considerable negative factor.

In order to solve the condensation problem in aeroplanes, attempts have been made to use ground-based dehumidifying equipment which is connected to the aeroplane when stationed on ground. During the dehumidification on ground, which also is very time-consuming, the cabin must be entirely closed, which implies that the dehumidification is difficult to carry out at the same time with technical work being carried out inside the aeroplane.

Another solution which has been applied to diminish corrosion damage from condensated water is to treat the surfaces being exposed to corrosion with water-proof or water-repelling materials. However, up to now these methods have not lead to any success, instead inspections and repairs must be carried out in a continously increasing frequency the older the aeroplanes become.

A general known procedure to make water in humid air to condense is to let the humid air pass cold surfaces with a temperature below dew point. This procedure is applied in, e.g., known freon-based air conditioning equipment in housing, vehicles, etc.

SUMMARY OF THE INVENTION

The purpose of the present invention is to prevent water vapour in humid air in an inner space of a monocoque structure, which has an outer, at least an essentially hermetic shell, and an inner partition which is devised with a space against the hermetic shell, e.g. a pressure cabin of an aeroplane, from condensing into water and possibly freezing into ice on the inside of the outer hermetic shell and in the space between, and to remove existing water, if any, from this space. This water might for example have been created earlier through condensation of water vapour in humid air under a situation where no dehumidification has taken place. By preventing condensation from occurring mainly on the hermetic shell of the structure, corrosion is avoided on the bearing parts of the structure. The purpose is further to, avoid damage to e.g., existing electrical components and to reduce the amount of water to be found inside of the structure, e.g., absorbed by hygroscopic materials, and increasing its weight. Another purpose of the invention is to regulate the humidity of the cabin, as the air that normally is directed into the cabin from the engines of the aeroplane is very dry.

The purpose has been fulfilled with a method wherein dry air with a relative humidity of less than 50%, preferably less than 10% and particularly less than 5%, is directed into the space between the outer shell and the inner partition of the monocoque structure. The dry air is preferably directed into the space at the shell with a pressure that is higher than in an inner space, which is enclosed by the inner partition, whereafter this air is made to enter into the inner space after having absorbed humidity from the surfaces surrounding the space. Furthermore, the dry air is preferably heated before being directed into the space at the shell to a temperature of at least 10° C., preferably 20° C., and particularly 30° C.

In a specific application of the invention a pressure cabin constitutes the inner space of the monocoque structure of an aeroplane. The dry air, which is directed into the space between the outer shell and the inner partition of the pressure cabin, can thereby be created by directing heated dry outer air from at least one of the engine compressors of the aeroplane via regulation devices for pressure and temperature into the space between the outer shell and the inner partition before being directed into the inner space which is enclosed by the inner partition. Preferably the dry air is however created by making humid air from the cabin to pass through at least one dehumidifying device, before being directed into the space between the outer shell and the inner partition. In order to maintain the cabin pressure, dry heated air from the outside from at least one of the engine compressors of the aeroplane is directed into the cabin simultaneously with humid air being redirected into the cabin from the dehumidifying device. The surplus of humid air from the dehumidifying device is lead away from the cabin through an outlet valve of the aeroplane.

It is an advantage to split the pressure cabin of the aeroplane into a passenger compartment and a freight compartment, whose spaces are separated by transverse partitions in the aeroplane or by the floor of the aeroplane, on which the passenger seats of the aeroplane are placed. Therefore air from the passenger compartment of the cabin can be made to pass through a first dehumidifying device, whereafter dry air from this one is directed into the space between the outer shell and the inner partition which is adjacent to the passenger compartment, and air from the freight compartment of the cabin is made to pass through a second dehumidifying device, whereafter dry air from this one is directed into the space between the outer shell and the inner partition adjacent to the freight compartment. In this way the two dehumidifying systems can accordingly be kept separated so that any smoke fumes from a fire in the freight compartment are prevented from penetrating into the passenger compartment via the space between the outer shell and the inner partition.

The space between the outer, hermetic shell and the inner, possibly heat-insulated partition can be of a very varied size. In an aeroplane for ca 150 passengers this space can be the form of a compartment of ca 0.01–1.0 m along the length of the aeroplane body, but also constitute a larger space as for a component compartment, which is not provided with an inner partition against the outer shell. The inner partition can in the latter case constitute the floor of the passenger compartment or a transverse partition in the aeroplane.

It has turned out to be advantageous to direct the dry air flow to parts of the monocoque structure especially sensitive to corrosion. In an aeroplane it is particularly important to prevent corrosion-causing condensation in bearing parts of the structure such as, e.g., attachment points of the wings, landing gear and engine attachments.

The present invention is also directed to a device for carrying out the method according to what is described above, which is characterized by means to direct dry air with a pressure which exceeds the pressure in the intermediate space, which means are connected to at least one inlet opening in the outer shell and/or the inner partition of the monocoque structure, whereby preferably at least one dehumidifying device is permanently mounted in connection with the monocoque structure, e.g. within an aeroplane, and that inlet openings in the inner partition and/or in the outer shell are devised for directing dry air into the space between the outer shell and the inner partition.

The invention is, which can be concluded from the above mentioned, not limited to aircraft pressure cabins, but is applicable to all kinds of monocoque structures which show a space between an outer hermetic shell and an inner partition being extended along this shell. Further details concerning the application of the invention is described in connection with the enclosed drawings.

DESCRIPTION OF THE DRAWINGS

The invention is described below in the form of a model in connection with the enclosed drawings.

DETAILED DESCRIPTION OF THE DRAWINGS

Figure 1:
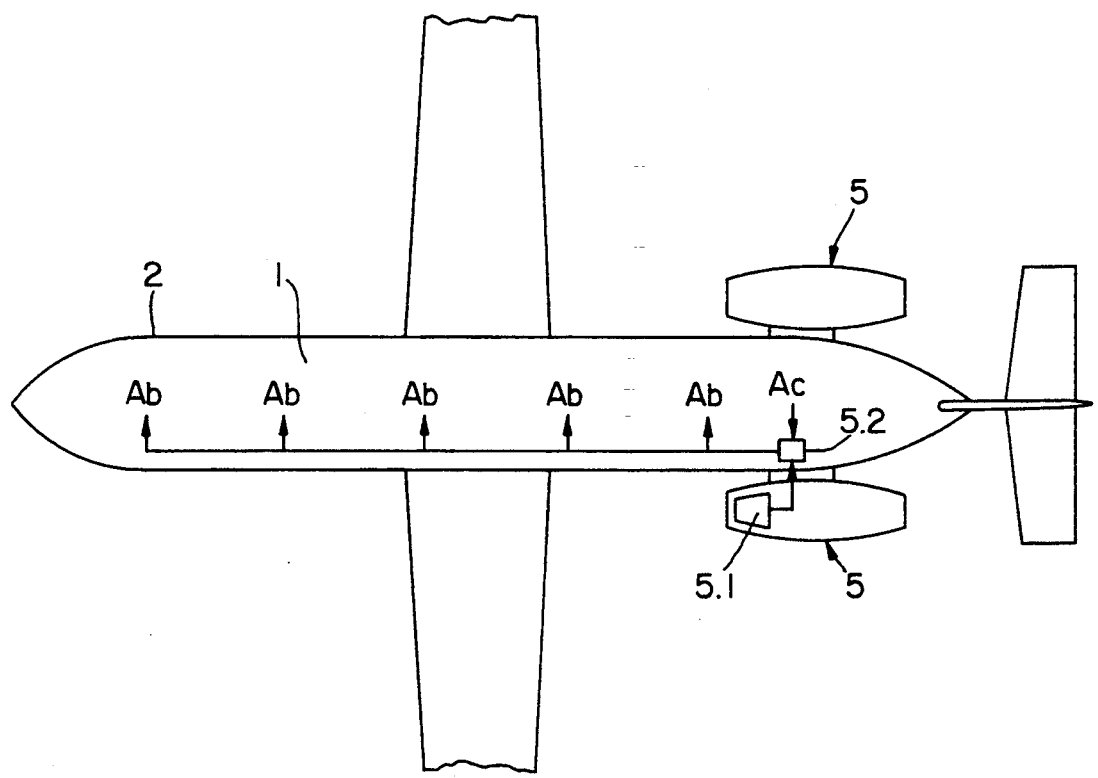
FIG. 1 shows a schematic aeroplane in a plan view, in which a pressurization system for a pressure cabin is shown diagrammatically.
Figure 3:
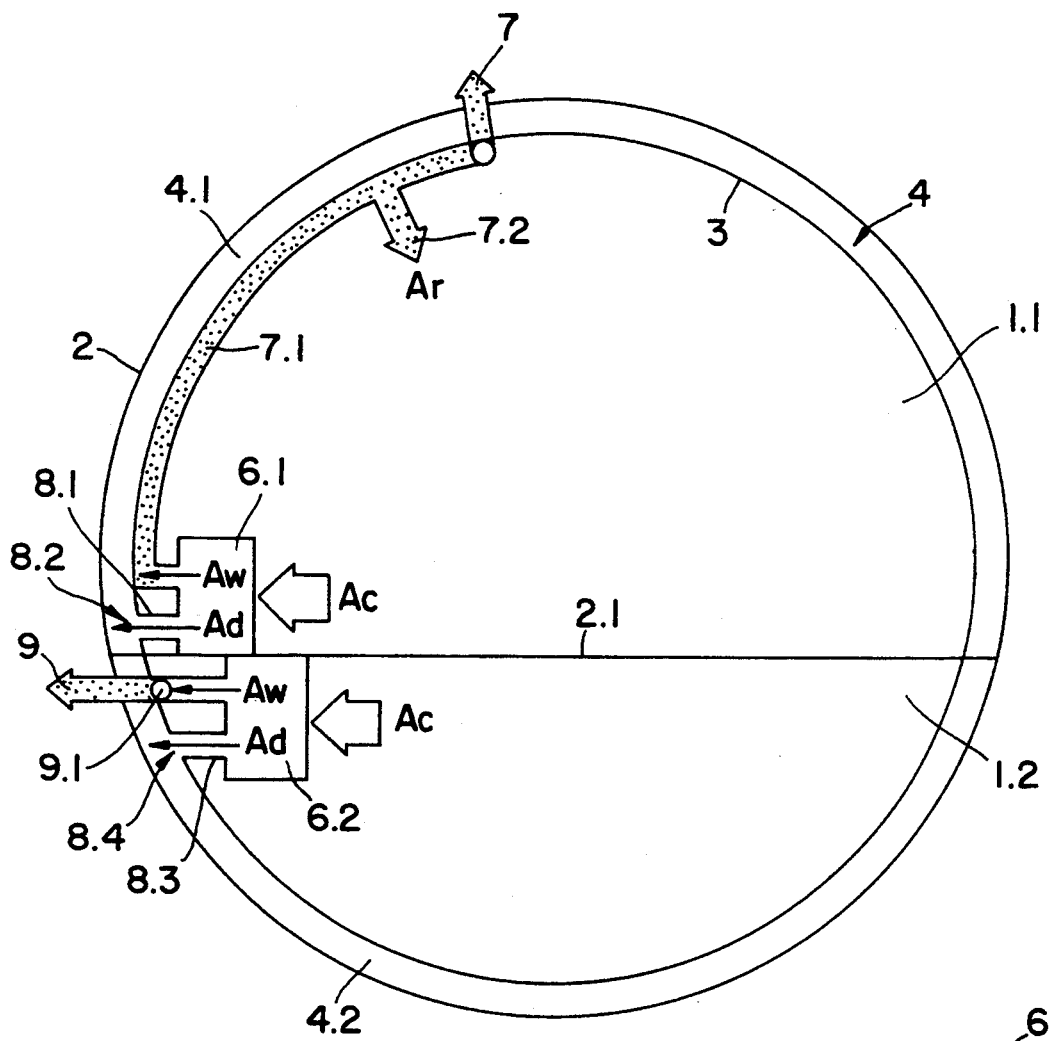
FIG. 3 shows diagrammatically an aeroplane in a transverse cross section through a pressure cabin which shows an upper passenger compartment and a lower freight compartment.

The aeroplane in the example is equipped with a pressure cabin having an inner space 1, which is surrounded by an outer hermetic shell 2 and an inner, heat-insulated partition 3 extending along the shell 2 with a space 4 adjacent the shell 2. The inner space 1 in the cabin in FIG. 3 is divided into two compartments, one passenger compartment 1.1 and one freight compartment 1.2, which are kept separated by an essentially hermetic floor 2.1. Through this floor 2.1 the space 4 between the outer shell 2 and the inner partition 3 is also divided into two sections 4.1, 4.2 in connection with the two compartments 1.1, 1.2 of the cabin. Heated external air from the aeroplane's engines 5 is directed into the cabin in a known way, which is however not shown on the figure. The heated external air is tapped at a respective engine from a compressor 5.1 in a known way at a temperature of ca 200° C. and is thereafter made to pass a regulator mixer 5.2, in which the air is cooled in one or more steps to a temperature of ca 20° C. before being blown under pressure into the inner space 1 of the pressure cabin. The air being blown in is named Ab on FIG. 1. In the regulator mixer 5.2 the air humidity is also regulated possibly through the mixing in of cabin air, named Ac in FIG. 1, or condensation of water depending on the humidity of the external air.

Figure 2:
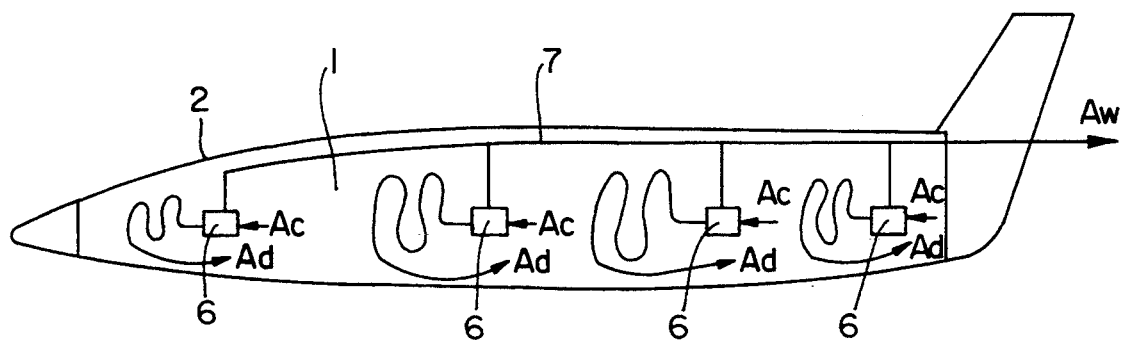
FIG. 2 shows an aeroplane diagrammatically in a longitudinal cross section through its pressure cabin.

A number of dehumidifying devices 6 for cabin air, named Ac in FIG. 2, are placed along the length of the cabin, with whose help dry air is created and made to flow into and through the space 4 between the outer shell 2 and the inner partition 3. These air flows are named Ad on FIG. 2. Humid air from the dehumidifying devices 6 is tapped to a first outlet tube 7 common to several dehumidifying devices 6, and is made to leave the cabin to the external air. The released air flow is named Aw in FIGS. 1 and 2.

In FIG. 3 a first dehumidifying device 6.1 is shown placed in the cabin's 1 passenger compartment 1.1 and a second dehumidifying device 6.2 is placed in its freight compartment 1.2. The first dehumidifying device 6.1 is connected to the first outlet tube 7 for humid air Aw via a connection tube 7.1, as well as connected to the upper space section 4.1, which is located along the passenger compartment 1.1, via a first inflow tube 8.1 and a first inlet opening 8.2 for dry air Ad. The connection tube 7.1 shows also a redirection 7.2 of humid air Ar to the cabin's passenger compartment 1.1. The dry air Ad is directed into the upper space section 4.1 with a pressure which is higher than the air pressure in the passenger compartment 1.1 and penetrates therefore into the passenger compartment 1.1 through the not hermetic inner partition 3 after having absorbed humidity from those surfaces in the upper space section 4.1 on which condensation has been formed.

The second dehumidifying device 6.2 is connected to a second common outlet tube 9 for humid air Aw via a connection tube 9.1, as well as to the lower space section 4.2, which is located along the freight compartment 1.2, via a second inflow tube 8.3 and a second inlet opening 8.4 for dry air Ad. The upper space section 4.1 is kept separated from the lower space section 4.2 as the floor 2.1 also extends through the space 4. Air from the lower space section 4.2 is redirected to the freight compartment 1.2 through the not hermetic inner partition 3 as at the passenger compartment 1.1.

Figure 4:
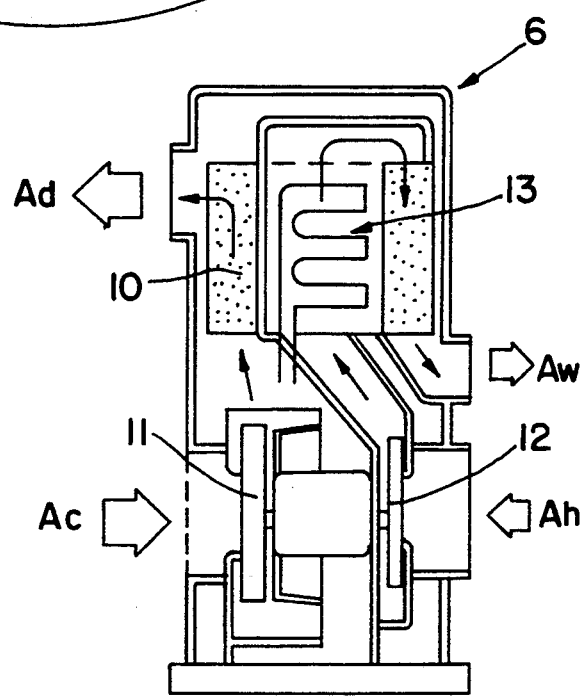
FIG. 4 shows diagrammatically in a transverse cross section an absorption dehumidifier existing on the market.

The dehumidifying device 6 which is meant for being used in order to create the dry air Ad is known in itself and constitutes a so called absorption dehumidifier. An example of a known and on the market existing such dehumidifier is shown in FIG. 4 in order to complete the description of the invention. The invention is however not restricted to the use of such a dehumidifier. This device contains a rotor 10, which is equipped with a humidity-absorbing material, which rotates slowly inside the device and thereby is passed by two separate air flows. The humid cabin air Ac, which is to be dehumidified, is made, with the help of a first fan 11, to pass the rotor 10 in a distinct direction, so that its humidity is absorbed by the rotor 10. Pre-heated air, so called regulation air Ah is, with the help of a second fan 12 simultaneously made to flow through the rotor 10 at another section of it, so that the humidity in the rotor 10 is absorbed by the regulation air Ah which thereafter is led away entirely from the construction in form of humid air Aw or is partly redirected as regulation air Ar in the way described above. The regulation air Ah is preheated with the help of an air pre-heater 13, through which the regulation air Ah is made to pass.

Figure 5:
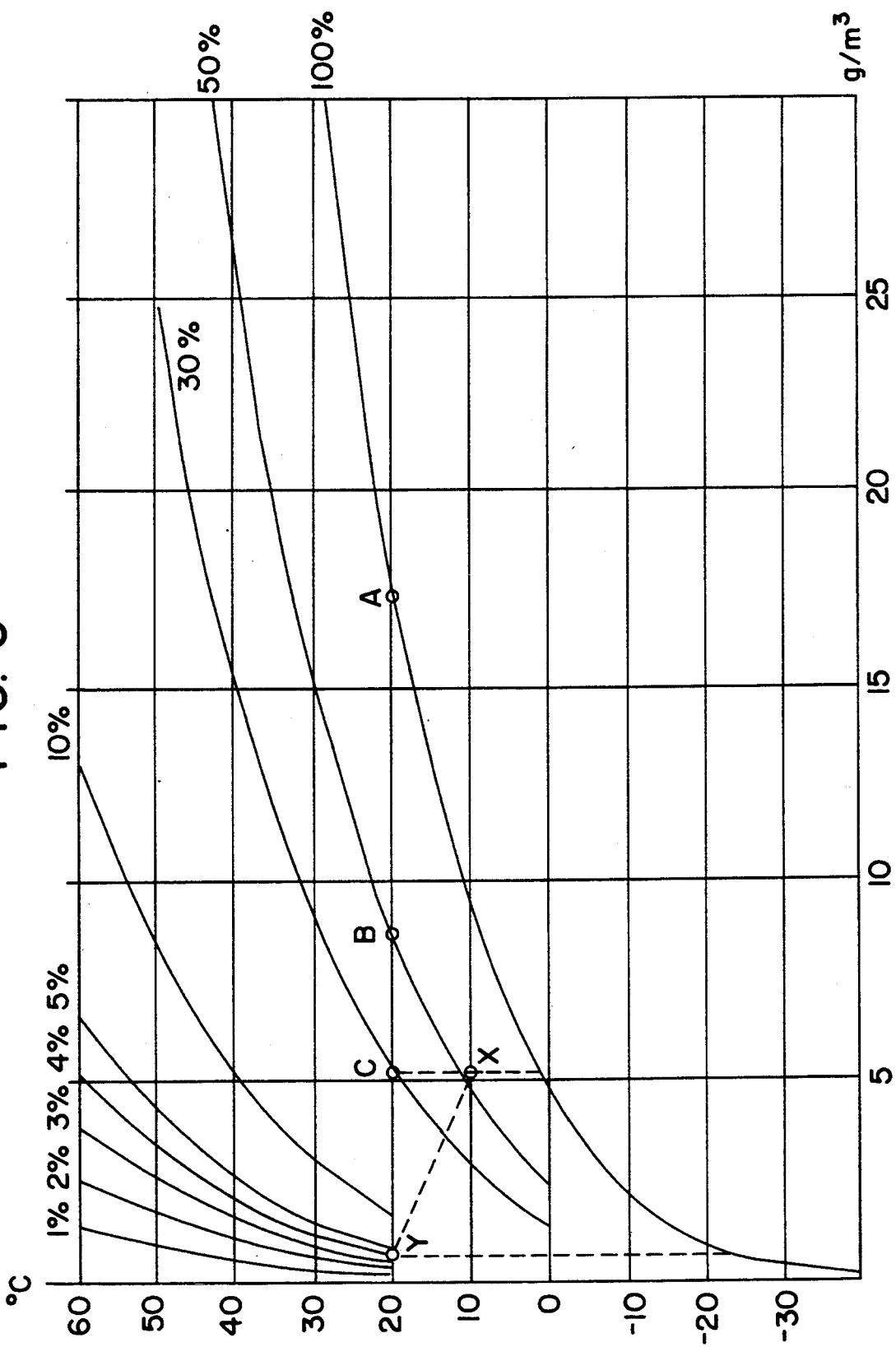
FIG. 5 shows a diagram with the water content in the air at different temperatures and relative humidity.

In the diagram of FIG. 5 the situation is shown in the space 4 between the outer shell 2 and the inner partition 3 of a cabin in an aeroplane concerning the Ac temperature, relative humidity RH and dew point of the cabin air as well as without and with the use of dehumidifying devices according to the invention. In an aeroplane with passengers and a closed cabin, the cabin air Ac has in this example a temperature of 20° C. and 100% RH when stationed on ground. This point is named A in the diagram. After taxing and start the relative humidity of the cabin air Ac has been reduced to ca 50% RH through dry air Ab being directed from the engine compressors at unchanged temperature. This point is named B in the diagram. After ca 20 minutes flight at an external temperature of ca $-20°$ C., the relative humidity of the cabin air Ac has been reduced to ca 30% RH. Point C in the diagram.

Without the use of dehumidifying devices, the cabin air Ac has in this position a dew point of ca 0° C. The temperature in the space between the outer shell 2 and the inner partition 3 of the cabin is however lower than the dew point, wherefore the humid cabin air Ac which penetrates into the space 4, condensates and creates water which usually also freezes into ice.

With the help of dehumidifying devices 6 according to the invention, cabin air Ac is drawn in directly at the inner partition 3, where the air temperature is ca 10° C., point X in the diagram, to the dehumidifying devices, in which the relative humidity is reduced to 4% RH and its temperature is increased to 20° C. Point Y in the diagram. The dry air Ad which then is blown into the space 4 between the outer shell 2 and the inner partition 3, then has a dew point of $-23°$ C. and no condensation takes place in the space 4.

The above mentioned alternative method, wherein heated external air from the aeroplane's engine compressors is directed into the space 4 between the outer shell 2 and the inner partition 3 in order to prevent water vapour from condensing into water and also to remove any existing water from the space 4, is not shown in the diagram of FIG. 5.

We claim:

1. A method of preventing condensation of water vapor from air in an intermediate space in a monocoque structure provided between and defined by an outer hermetic shell and an inner partition thereof and for removing any existing water from said intermediate space, said inner partition defining an inner space within the structure, said method comprising the steps of passing humid air from said inner space through at least one dehumidifying device so as to provide dry air having a relative humidity of less than 50%, and then passing said dry air into said intermediate space.

2. A method as claimed in claim 1, wherein the dry air has a relative humidity of less than 10%.

3. A method as claimed in claim 1, wherein the dry air has a relative humidity of less than 5%.

4. A method as claimed in claim 1, wherein the dry air directed into the intermediate space is at a pressure which is higher than the air pressure in said inner space, said dry air entering the inner space after having absorbed humidity from surfaces which surround the intermediate space.

5. A method as claimed in claim 1, wherein the monocoque structure is an airplane having an engine compressor and a regulating device, and including the step of mixing dry air obtained from said engine compressor via said regulation device with said humid air from said inner space prior to passing through said at least one dehumidifying device.

6. A method as claimed in claim 5, wherein the inner space is a passenger compartment of a cabin and said intermediate space comprises a first part adjacent the passenger compartment of the cabin and a second part adjacent a freight compartment, said humid air from said inner space being passed to said first part of said intermediate space, and wherein air from said freight compartment is passed through a further dehumidifying device and dried, and then directed into said second part of said intermediate space.

7. A method according to claim 6 wherein all humid air from the further dehumidifying device is dumped overboard from the outer shell.

8. A method as claimed in claim 1, including a step of heating the dry air to a temperature of at least 10° C. before being directed into the space.

9. A method as claimed in claim 8, wherein the temperature is at least 20° C.

10. A method as claimed in claim 9, wherein the temperature is at least 30° C.

11. A monocoque structure which includes an outer, hermetic shell; an inner partition within said outer shell, said inner partition providing an inner space therewithin and an intermediate space between said inner partition and said outer shell; treatment means for providing dry, pressurized air, and conduit means extending between said treatment means and said intermediate space for delivering said dry, pressurized air from said treatment means directly to said intermediate space so as to prevent condensation of water vapor in said intermediate space and remove any water present therein.

12. A monocoque structure according to claim 11, wherein said treatment means includes heating means for heating said dry, pressurized air.

13. A monocoque structure according to claim 11, wherein said inner space contains humid air, and wherein said treatment means includes a dehumidifying device for dehumidifying some of said humid air in said inner space to provide said dry, pressurized air.

14. A monocoque structure which includes an outer, hermetic shell; a floor which extends within said outer shell to divide an interior of said outer shell into first and second compartments; a first inner partition which extends within said first compartment to provide a first inner space therewithin and a first intermediate space between said first inner partition and said outer shell; a second inner partition which extends within said second compartment to provide a second inner space therewithin and a second intermediate space between said second inner partition and said outer shell; a first treatment means for providing first dry, pressurized air, first conduit means extending between said first treatment means and said first intermediate space for communicating dry, pressurized air from said first treatment means directly to said first intermediate space; second treatment means for providing second dry, pressurized air, and second conduit means extending between said second treatment means and said second intermediate space for communicating said second dry, pressurized air from said second treatment means directly to said second intermediate space, said first and second dry, pressurized air having a relative humidity of less than 50%.

15. A method of preventing condensation of water vapor in an intermediate space provide between and defined by an outer hermetic shell and an inner partition of an airplane and for removing any existing water from said intermediate space, said inner partition defining an inner space within said airplane, said airplane including an engine compressor, said method comprising the steps of passing heated air from said engine compressor through at least one dehumidifying device so as to provide dry air having a relative humidity of less than 50%, and then passing said dry air into said intermediate space.

* * * * *

UNITED STATES PATENT AND TRADEMARK OFFICE
CERTIFICATE OF CORRECTION

PATENT NO. : 5,386,952
DATED : February 7, 1995
INVENTOR(S) : Christer Nordstrom et al.

It is certified that error appears in the above-indentified patent and that said Letters Patent is hereby corrected as shown below:

On the title page, Item
[73] Assignee: CTT Systems Aktiebolag, Stigtomta, Sweden Signed and Sealed this Sixteenth Day of May, 1995

Attest:

BRUCE LEHMAN

Attesting Officer

Commissioner of Patents and Trademarks